United States Patent
Ruedinger et al.

(10) Patent No.: US 8,466,076 B2
(45) Date of Patent: *Jun. 18, 2013

(54) POLYSILANE-POLYCARBOSILANES WITH REDUCED CHLORINE CONTENT BASED ON METHYLCHLOROPOLYSILANES, AND SPINNING DOPES AND CERAMIC MOLDINGS PRODUCED THEREFROM

(75) Inventors: Arne Ruedinger, Rottendorf (DE); Juergen Clade, Wuerzburg (DE); Heiko Spaniol, Geisa (DE); Dieter Sporn, Hameln (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 41 days.

This patent is subject to a terminal disclaimer.

(21) Appl. No.: 13/140,677

(22) PCT Filed: Dec. 21, 2009

(86) PCT No.: PCT/EP2009/067703
§ 371 (c)(1),
(2), (4) Date: Jun. 17, 2011

(87) PCT Pub. No.: WO2010/072739
PCT Pub. Date: Jul. 1, 2010

(65) Prior Publication Data
US 2011/0263780 A1    Oct. 27, 2011

(30) Foreign Application Priority Data
Dec. 22, 2008   (DE) .................. 10 2008 064 372

(51) Int. Cl.
C04B 35/71 (2006.01)
C04B 35/80 (2006.01)
C04B 35/565 (2006.01)

(52) U.S. Cl.
USPC .......... 501/95.2; 264/433; 501/88; 501/95.1; 528/35; 528/481

(58) Field of Classification Search
None
See application file for complete search history.

(56) References Cited

U.S. PATENT DOCUMENTS

| 4,100,233 A | 7/1978 | Yajima et al. |
| 4,298,559 A | 11/1981 | Baney et al. |
| 4,310,482 A | 1/1982 | Baney |
| 4,314,956 A | 2/1982 | Baney et al. |
| 4,772,516 A | 9/1988 | Mahone |
| 4,792,591 A | 12/1988 | Rengstl et al. |
| 5,051,215 A | 9/1991 | Rabe et al. |
| 5,616,308 A | 4/1997 | Richter et al. |
| 2004/0030083 A1 | 2/2004 | Tashiro |

FOREIGN PATENT DOCUMENTS

| EP | 0 315 953 B1 | 10/1993 |
| EP | 0 610 809 B1 | 9/2000 |
| GB | 2 258 465 A | 2/1993 |
| WO | WO 2005/108470 A1 | 11/2005 |

OTHER PUBLICATIONS

"A New Type of Precursor for Fibers in the System Si-C" authored by Clade et al. and published in the Journal or European Ceramic Society (2005) 25, 123-127.*
Shimoo et al., "Mechanism of Conversion from Oxidation-Cured Polycarbosilane to SiC Ceramic Fibers" J. Ceram. Soc. Jap., Int. Ed. 102 (1994), pp. 952-958.
Baney et al., "Methylchloropolysilanes and Derivatives Prepared from the Redistribution of Methyichlorodisilanes," Organometellics 2 (1983), pp. 859-864.
Gupta et al, "Manufactured Fiber Technology," Chapman & Hall 1997, pp. 126-133.
Lipowitz et al. "Silicon Carbide Fibers from Methyipolysilane (MPS) Polymers," Ceram. Eng. Sci. Proc. 9 [7-8] (1988), pp. 931-942.
Hengge et al., "Darstellung und Eigenschaften von Methyl-methoxydisilanen," Monatsh. Chem. 99 (1968), pp. 340-346.
PCT Int'l Preliminary Report on Patentability, PCT/EP2009/067703, Jul. 7, 2011.

* cited by examiner

Primary Examiner — Marc Zimmer
(74) Attorney, Agent, or Firm — Duane Morris LLP

(57) ABSTRACT

The present invention pertains to a process for producing unmeltable polysilane-polycarbosilane copolymers which are soluble in inert solvents, comprising the steps
  providing the product of a disproportionation of a methylchlorodisilane or a mixture of several methylchlorodisilanes of the composition $Si_2Me_nCl_{6-n}$, wherein n=1–4, wherein the disproportionation was carried out with a Lewis base as a catalyst, wherein this product is a chlorine-containing, crude polysilane/oligosilane containing hydrocarbon groups, and
  thermally postcrosslinking the crude polysilane/oligosilane to a polysilane-polycarbosilane copolymer,
    characterized in that the chlorine content of the polysilane-polycarbosilane copolymer is lowered by reacting the crude polysilane/oligosilane with a substitution agent, by which chlorine bound therein is replaced with a chlorine-free substituent.
Green fibers and low-oxygen/oxygen-free ceramic fibers with a very low chlorine content can be produced using this process.

17 Claims, No Drawings

POLYSILANE-POLYCARBOSILANES WITH REDUCED CHLORINE CONTENT BASED ON METHYLCHLOROPOLYSILANES, AND SPINNING DOPES AND CERAMIC MOLDINGS PRODUCED THEREFROM

The present invention pertains to polysilane-polycarbosilane copolymers that are produced starting from chlorine-containing silanes by means of specific heat treatment and are made poorly meltable or unmeltable. The copolymers according to the present invention are characterized by a markedly reduced chlorine content. The present invention also pertains to a process for producing green fibers and ceramic fibers using solutions or spinning dopes from polysilane-polycarbosilanes, as well as a process for the construction of ceramic matrices. Moreover, it pertains to green fibers and ceramic moldings, especially fibers, which can be produced from the polysilane-polycarbosilanes.

Silicon carbide materials are known for their mechanical strengths at high temperatures as well as their good oxidation resistance. Therefore, they are considered for a large number of applications, above all in the form of fibers as reinforcing elements in components, which are exposed to high temperatures and/or corrosive media.

Polysilanes were isolated for the first time by Kipping via Wurtz coupling of diphenyldichlorosilane with sodium. Dodecamethyl cyclohexasilane was used for the first time by Yajima et al. as a starting material for producing SiC ceramic fibers. For this purpose, the compound must be crosslinked in an autoclave using high temperature and overpressure, wherein a conversion into polycarbosilanes takes place (Kumada rearrangement). After extracting the low-molecular-weight components, an unmeltable, high-molecular-weight polycarbosilane powder is obtained. Solutions of this powder in benzene or xylene can be processed according to the dry spinning process into green fibers, which can be pyrolyzed into SiC ceramic fibers without prior curing. The essential drawback of this process is the complicated synthesis of the starting polymer, which includes the use of alkali metals, reactions in the autoclave and an elaborate extraction process.

In a variant of this process, the application of high pressures in the crosslinking and conversion into polycarbosilane is dispensed with, which leads to a meltable material. This can be processed according to the melt spinning process into green fibers, which must then be cured, however, before pyrolysis by aging in air at elevated temperature. Therefore, the resulting ceramic fibers contain several wt. % of oxygen, which considerably impairs their high-temperature resistance. Both process variants were patented, see U.S. Pat. No. 4,100,233.

Furthermore, the synthesis of a phenylmethyl polysilane by means of Wurtz coupling of a mixture of phenylmethyl- and dimethyldichlorosilane and the synthesis of branched polysilanes by means of Wurtz coupling of $R_2SiCl_2/RSiCl_3$ mixtures (R=methyl, ethyl or phenyl) are known. The spinning behavior (melt spinning process) of the polymers obtained was investigated. Numerous other processes for the synthesis of polycarbosilanes were suggested. Many of these processes are listed in WO 2005/108470.

The disproportionation of disilanes with Lewis bases to mono- and polysilanes was discovered in 1953 by Wilkins. The corresponding reaction with methylchlorodisilane mixtures from the Müller-Rochow synthesis was described by Bluestein as well as by Cooper and Gilbert. Roewer et al. investigated the disproportionation of the methylchlorodisilanes $Cl_2MeSiSiMeCl_2$, $Cl_2MeSiSiMe_2Cl$ and $ClMe_2SiSiMe_2Cl$ both under homogeneous and heterogeneous catalysis. Nitrogen-containing heterocyclic compounds, and especially N-methylimidazole, were used in the former, and nitrogen-containing heterocyclic compounds or bis(dimethylamino)phosphoryl groups, which were bound to the surface of a silicate carrier, were used in the latter. Several oligosilanes could be identified in the product mixture. A heat aftertreatment of the polysilanes for their conversion into polycarbosilanes is disclosed in EP 0 610 809 A1; however, this gaseous product is again meltable at least in case of relatively mild heat treatment (up to 220° C.).

The production of silicon carbide fibers from the polysilanes thus obtained was also described, e.g., in EP 668 254 B1. Since the polysilanes are meltable, however, the green fibers must be cured at elevated temperature before pyrolysis with ammonia.

For stabilizing the shape of green fibers obtained from polycarbosilanes by means of melt spinning, a curing is usually necessary in order to make the material unmeltable before pyrolysis. This curing is usually performed by means of treating with reactive gas. The originally practiced curing with air at elevated temperature has the drawback of elevated oxygen transfer into the fibers, which highly impairs their high temperature resistance (fiber damage due to degassing of CO and/or SiO at high temperatures (T. Shimoo et al., *J. Ceram. Soc. Jap., Int. Ed.*, 102 (1994) 952). Therefore, attempts have also been made to reduce the transfer of oxygen during the curing of green fibers. Lipowitz (U.S. Pat. No. 5,051,215) describes the curing of green fibers with $NO_2$ instead of air; here, the oxygen uptake of approx. 10-15 wt. % (air curing) is reduced to <7 wt. %. However, a minimum oxygen content of 5-6 wt. % is needed to avoid coalescences in the fiber bundle. The likewise suggested curing by means of radiation with high-energy electrons should in turn be associated with an unwanted transfer of oxygen, which ultimately brings about the curing.

Thus, the drawback of the older processes is that the fibers made of meltable starting materials, as was explained above, must be precured by aging in air or using ammonia at elevated temperatures, which leads to elevated, undesired oxygen contents and other drawbacks. On the other hand, fibers made of unmeltable, high-molecular-weight polycarbosilane powders can indeed be processed from solutions of these powders in benzene or xylene according to the dry spinning process into green fibers that can be pyrolyzed into SiC ceramic fibers without prior curing; however, the path to such unmeltable powders is cost-intensive and elaborate.

To solve this problem and to come to a simple, manageable process, a process for the production of a polysilane-polycarbosilane copolymer solution, from which low-oxygen ceramic moldings with a composition close to SiC can be produced, is disclosed in WO 2005/108470. The starting material for this solution is cost-effective and readily accessible and can be very simply converted into an unmeltable material suitable for dry spinning that can be converted into the corresponding ceramic material after shaping without further treatment.

The starting material mentioned are polysilanes, which can be obtained with Lewis base catalysts by means of disproportionation of methylchlorodisilane mixtures, as they are obtained as high-boiling fraction in the direct synthesis of methylchlorosilanes (Müller-Rochow process (U.S. Pat. No. 2,380,995 (1941); R. Müller, *Wiss. Z. Techn. Univ. Dresden* 12 (1963) 1633)[)]. These can be easily modified using a subsequent, specific heat treatment, such that they are poorly meltable or unmeltable, but are still largely soluble in inert solvents, so that they can be further processed in a molding process. Solutions of these materials, which are called "polysilane-polycarbosilane copolymers" below, can be used, e.g., for the production of fibers according to the dry spinning process or for construction of ceramic matrices according to the liquid-phase infiltration process. Polymer fibers, which can be obtained from these solutions, can be pyrolyzed coalescence-free to low-oxygen SiC ceramic fibers without further shape-stabilizing treatment in the bundle.

However, these fibers have the drawback that they still have a relatively high chlorine content (from 8 wt. % to 12 wt. %), which brings about a certain susceptibility to corrosion. Ceramic SiC fibers, which are produced from copolymer solutions as those mentioned above, do not lose this chlorine content up to a maximum temperature treatment of approx. 1,200° C. The chlorine content can be reduced to less than 1 wt. % only by higher temperatures (approx. 1,800° C.). However, as a result of this, the fiber is extremely damaged, such that the mechanical properties, such as maximum tensile stress and modulus of elasticity drop sharply. A discharge/exchange of the chlorine in the ceramic fiber by means of reactive gases such as hydrogen, forming gas, ammonia, etc., leads to a reduction in the mechanical properties of the resulting ceramic fibers as well.

Disproportionation of disilanes with Lewis bases to mono- and polysilanes was already mentioned above, likewise the corresponding reaction with methylchlorodisilane mixtures from the Müller-Rochow synthesis. A more detailed investigation of the residue forming in the disproportionation with tetrabutylphosphonium chloride was carried out by Baney et al., see *Organometallics* 2 (1983) 859. Here, pure polysilanes form, but no polysilane-polycarbosilane copolymers. It can be assumed that the disproportionation catalyst is at least partly incorporated into the product, so that the polysilanes as well as the successor products forming therefrom contain phosphorus. This is a drawback with regard to the oxidation resistance of ceramics produced therefrom, because phosphorus has a high affinity for oxygen. Also, phosphorus—by contrast to silicon—does not form carbide.

The production of mostly Cl-free methylpolysilane or methylhydridopolysilane by reacting this residue with Grignard compounds or LiAlH$_4$ was also described by Baney et al. (U.S. Pat. Nos. 4,298,559; 4,310,482). Chlorine reduction by means of an alkylation with Grignard reagents is, however, very expensive. Moreover, green fibers, which were produced from such a polysilane permethylated by a Grignard reaction, must be cured (J. Lipowitz et al., *Ceram. Engng. Sci. Proc.* 9[7-8] (1988) 931; however, more detailed information is not provided on this). A chlorine substitution by methoxy groups according to the reaction with methanol/pyridine or with methyl orthoformate suggested by E. Hengge, N. Holtschmidt, *Monatsh. Chem.* 99 (1968) 340, cf. T. Lange, dissertation, TU Freiburg 2006, is conceivable, but would be associated with the undesirable incorporation of oxygen in the polymer and ceramic.

Baney et al. suggest chlorine reduction of polysilanes obtained by catalysis with butylphosphonium chloride by substituting halides with —NHR groups. Various amines are mentioned as substitution agents. However, practically only primary amines or ammonia can be used for these substitutions. Especially products with —NHR terminal groups cannot be obtained with secondary amines, because Cl bound to Si must always be substituted via an NH function. Accordingly, all the examples show a substitution with primary amines. According to the examples, a product was able to be obtained with aniline, whose chlorine content was lowered from 19.8 wt. % initially to 8.9 wt. %, while partly a pyrophorous material, partly a rubber-like, yellow fluid with a chlorine content of only 1.6 wt. % was obtained with alkylamines, see Baney et al. in *Organometallics*, loc. cit., and U.S. Pat. No. 4,314,956. Since disilanes are colorless and an intensification of the color to dark brown occurs with increasing polymerization, a relatively low degree of crosslinking can be concluded from the color.

A reduction in the chlorine content of various silazanes is likewise known from the state of the art. Thus, it is suggested in DE 38 84 753 T2 to lower the chlorine content of methylpolydisilylazane polymers of formula $(Me_3SiNH)_{6-x-2y}Me_xSi_2(NH)_y$ from 3-5 wt. % to less than 0.5 wt. % by treating these polymers in an organic solvent under pressure with ammonia. However, the polymers forming here are meltable; furthermore, they contain high percentages of nitrogen. According to DE 05 36 20 635, the chlorine content of all polysilane and/or polycarbosilane polymers that directly contain halogen bound to silicon atoms can be reduced by bringing these polymers into contact with hexamethyldisilazane. In the examples, only a few concrete starting materials are indicated; the products obtained are partly meltable and partly insoluble; their chlorine content is still very high. It is suggested in DE 37 43 423 C2 to abstract reactive chlorine or bromine atoms of alkylpolysilanes with aminolysis reagents such as ammonia, amines or aniline and to replace them with organic radicals. The products obtained according to the examples have a very low chlorine content; they are, however, meltable at least in most cases and partly insoluble in inert solvents; moreover, they contain relatively high oxygen percentages in many cases.

The object of the present invention is to provide a reliable process for producing low-oxygen or oxygen-free, soluble, unmeltable polysilane-containing polymers with a very low chlorine content (usually less than 1 wt. %, preferably less than 0.5 wt. %), which are poorly meltable or unmeltable, but can be dissolved in inert solvents. Moreover, the object of the present invention also comprises providing a process for producing green fibers and ceramic fibers from the polysilane-containing polymers thus obtained as well as providing the green fibers and ceramic fibers produced therefrom.

This object shall be accomplished according to the present invention without having to dispense with the starting material, which is suggested in WO 2005/108470, since it is cost-effective and can be easily obtained.

It is suggested according to the present invention to additionally use chlorine-containing silanes as starting materials and to convert these in an intermediate step into a crude polysilane/oligosilane carrying/containing hydrocarbon groups and to synthesize polysilane-polycarbosilane copolymers therefrom, but to lower the chlorine content of the polysilane-polycarbosilanes by reacting the crude polysilane/oligosilane with a substitution agent, by which chlorine is replaced with a nitrogen-containing, chlorine-free substituent.

The same chlorine- and hydrocarbon-group-containing silanes/oligosilanes, which are also indicated in WO 2005/108470 A1 as starting materials, are used as starting material for the production of the polymers. They are mixtures of methylchlorodisilanes with the composition $Si_2Me_nCl_{6-n}$ (n=1-4), and preferably those which are obtained as a high-boiling fraction (b.p. 150-155° C.) in the "direct synthesis" according to Rochow and Müller. The latter usually consists of a mixture of 1,1,2,2-tetrachloro-dimethyldisilane and 1,1, 2-trichloro-trimethyldisilane with less than 10 mol. % of other components. The two disilanes mentioned are preferably charged in a molar ratio between 0.5 to 1 and 1.5 to 1.

The disilane mixtures mentioned are disproportionated in a first step following, e.g., EP 610809 or U. Herzog et al., *Organomet. Chem.* 507 (1996) 221 under homogeneous catalysis with a nitrogen-containing Lewis base and preferably at elevated temperature, wherein the monosilane mixtures that are obtained as cleavage products during the action are continuously distilled off. The reaction temperature is preferably 150-300° C., more preferably 200-250° C. An organic nitrogen compound with Lewis basicity, but without N—H function, is used as a catalyst. Preferred catalysts are such nitrogen-containing heterocyclic compounds as pyridine, quinoline, N-methylpiperidine, N-methyl pyrrolidine, N-methylindole or N-methylimidazole. The amount of catalyst used is preferably 1 wt. % to 2 wt. %. The disproportionation otherwise takes place under the conditions known in the literature; it is especially favorable to keep moisture and oxygen away from the materials by using inert gas such as ultrapure nitrogen gas, since the product (called "crude polysilane/oligosilane" below) is susceptible to oxygen.

The addition of a crosslinking aid proves to be especially advantageous for producing the crude polysilane/oligosilane. This crosslinking aid may be an aryl halide silane, an aryl halide borane or a mixture of these compounds. Preferably, phenyltrichlorosilane, diphenyldichlorosilane and phenyldichloroborane are used as crosslinking aids, especially preferably phenyltrichlorosilane. The amount of crosslinking aid used is preferably 5 wt. % to 20 wt. %, and more preferably 10 wt. % to 15 wt. %.

The crude polysilane/oligosilane thus produced is dark brown and hence is considered to be more highly crosslinked than the polysilane obtained by Baney et al., loc. cit., by disproportionation with butylphosphonium chloride. This is favorable in regard to the later, continuous thermal crosslinking because the higher is the degree of crosslinking of the starting polysilane, the less expensive is this crosslinking.

According to the present invention, the crude polysilane/oligosilane or comparable product made of chlorine- and carbon-containing silanes is additionally subjected to a chlorine substitution. This chlorine substitution is carried out at the product of the disproportionation or comparable reaction to a crude polysilane/oligosilane, i.e., on the crude polysilane/oligosilane obtained here. The sequence of the steps to be carried out according to the present invention is based on the following findings of the inventors: In the disproportionation, a large part of the chlorine bound in the disilane mixture is already discharged in the form of cleavage products; the cleavage products can be returned as material into the process chain of the silicon production. If an attempt is made to lower the chlorine even further already in this step and to carry out the substitution already with the disilane fraction, a great deal more amine is to be used. Accordingly, more salt is obtained as waste product, and the cleavage products obtained during the disproportionation and crosslinking can no longer be further used in another way. At the same time, the amount of additionally removed chlorine continues to be unsatisfactory. Also, other problems arise in the disproportionation, which further lower the yield of the desired product. If, instead of this, the polysilane-polycarbosilane copolymer, which has already been postcrosslinked, is subjected to dechlorination, a low-chlorine product is obtained; however, this is no longer unmeltable and can thus not be spun according to the dry spinning process. Only with the finding of the solution according to the present invention, it could surprisingly be determined that it is decisive to carry out the dechlorination, on the one hand, at an early point in time, in order to obtain the unmeltableness of the material, and, on the other hand, not to place this point in time at the start of the reaction chain, however, because otherwise no products at all can be obtained that can be crosslinked until they are unmeltable.

The chlorine reduction by substituting chlorine atoms is carried out using amine and/or silylamine compounds, i.e., compounds that have at least one N—Si group or, more preferably, at least one N—H group. In a first embodiment of the present invention, they are preferably selected from among ammonia and primary or secondary amines. Amines of the formula $HNR^1R^2$, wherein $R^1$ and $R^2$ are, independently of one another, hydrogen, alkyl, alkenyl, aryl, arylalkyl, alkylaryl, arylalkenyl, alkenylaryl, which are possibly substituted with other amino groups, or $(R^3)_3Si—[NR^3—Si(R^3)_2]_m$ with m=0 to 6, or wherein $R^1$ and $R^2$ together represent an alkylene radical with 4 or 5 carbon atoms or $—Si(R^3)_2—[NR^3—Si(R^3)_2]_n—$ with n=1 to 6, are especially suitable. Silylamines, and especially silazanes of the formula $Si(R^3)_3—[NR^3—Si(R^3)_2]_n—R^3$, wherein n may be a whole number of 1–6, are used in a second embodiment. Each radical $R^3$ is in all cases identical or different and denotes hydrogen, alkyl or aryl. In a third, preferred embodiment, the compounds are secondary, cyclic amines, especially selected from among pyrrole, indole, carbazole, pyrazole, piperidine and imidazole. In a fourth embodiment, the substitution is carried out with a compound of the formula $N(R^4)_3$, wherein $R^4$ has the meaning $(R^3)_3Si$.

The number of amino groups in $R^1$ and $R^2$ is not limited, but is preferably 0 to 6 and more preferably 0 to 4. The number of carbon atoms in $R^1$, $R^2$ and $R^3$ is likewise not limited, but is preferably 1 to 6 for aliphatic radicals and 5 to 20 for aromatic and aliphatic-aromatic radicals.

More preferred are the amines selected from among ammonia, ethylenediamine, diethylamine, dimethylamine, methylamine, aniline, ethylamine, hexamethyldisilazane, heptamethyldisilazane and tris-(trimethylsilyl)amine. Especially preferred are those amines among those mentioned above that carry short-chain alkyl radicals, especially methyl and ethyl radicals. Dimethylamine is especially favorable. Secondary amines have the advantage that the polymers thus obtained carry $—NR_2$ groups, i.e., they are free from NH functions. The advantage lies in that, during the subsequent crosslinking of such substituted polysilane/oligosilanes, a polycondensation of amino groups is possible, which might lead to products which are less soluble or are no longer soluble at all, which is, of course, not desirable according to the present invention. Nevertheless, silylamines such as disilazanes instead of pure amines are likewise suitable, since the charging in of silicon atoms in the substitution does not result in any disadvantageous effects for the later moldings or fibers. Moreover, substitution with silylamines has the advantage that the chlorine is not obtained in the form of an ammonium salt, but in the form of trimethylchlorosilane, which is separated by distillation and can be returned into the process chain.

The chlorine reduction/substitution usually takes place as follows:

The starting material, i.e., the crude polysilane/oligosilane carrying/containing hydrocarbon groups, which is obtained by the above-described disproportionation, is dissolved in a suitable inert and aprotic solvent. Above all, aprotic, apolar solvents such as aliphatic hydrocarbons (e.g., n-pentane, n-hexane, cyclohexane, n-heptane, n-octane), halogenated hydrocarbons (e.g., methylene chloride, chloroform, carbon tetrachloride, 1,1,1-trichloroethane, chlorobenzene) or aromatic hydrocarbons (e.g., benzene, toluene, o-xylene, symmesitylene), and furthermore, ether-containing solvents (e.g., diethyl ether, diisopropyl ether, tetrahydrofuran, 1,4-dioxane or a higher or nonsymmetrical ether) are possible as solvents. The solvent is preferably a halogen-free hydrocarbon, especially preferably an aromatic hydrocarbon from the group benzene, toluene, o-xylene.

The substitution agent (amine) is added in a molar excess, which is preferably at least 2:1, related to the bound chlorine atoms in the starting material. The substitution agent is undiluted or added dissolved in an inert and aprotic solvent as indicated above. The addition may take place, e.g., by adding dropwise; preferably a temperature should be maintained between room temperature and the boiling point of amine or its solution. During or after the dropwise addition, a salt forms, which is insoluble in the solvent, or—in the case of substitution with silylamines—trimethylchlorosilane. The suspension is allowed to stand for some time, frequently several hours, or boiled under reflux up to the boiling point of the solvent. Subsequently, it is possibly cooled to room temperature, and if salt has formed, this is filtered off. The solvent as well as possibly formed trimethylchlorosilane is completely removed, for example, under vacuum.

If an amine that is present in the gas state during the addition to the crude polysilane/oligosilane is used, e.g., if ammonia is used, this may be introduced as gas or else condensed into a reaction vessel at temperatures below its boiling point or filled into same as liquid under excess pressure, in case of liquefied amines, optionally diluted with a suitable solvent as indicated above. Subsequently, the starting material, in turn dissolved as much as possible in the same solvent, is added. After complete addition, the batch is allowed to stand for a period similar to that described above or boiled under reflux and subsequently processed as described above.

The chlorine content of the thus treated starting material can usually be reduced to less than 0.2 wt. % by the process step according to the present invention.

Then, as described in WO 2005/108470, the crude polysilane/oligosilane is subjected to continuous heat treatment, in which, on the one hand, it is made poorly meltable or unmeltable by increasing the average molecular weight and, on the other hand, is converted into a polysilane-polycarbosilane copolymer by rearrangement reactions taking place here. Another effect of this heat aftertreatment, which is intended according to the present invention, is a further reduction in the content of chemically bound chlorine, if the preceding substitution should not be carried out quantitatively.

The heat aftertreatment usually takes place under atmospheric pressure, in which case it is highly recommended to work with exclusion of moisture and oxygen. Therefore, the material is preferably treated under inert gas, especially advantageously under ultrapure nitrogen atmosphere, wherein the temperatures can be raised to between 250° C. (or close to 300° C.) and 500° C., preferably between 380° C. and 450° C. and very especially preferably between 390° C. and 420° C. The heating preferably takes place continuously, for example, at a rate of 1-5 K/min., and preferably of 2-4 K/min. Low-molecular-weight methylsilylamines and sometimes methylchlorosilylamines obtained as cleavage products during the reaction are continuously distilled off. The endpoint of the heat aftertreatment becomes apparent by a sharp increase in the torque of the stirrer. During the subsequent cooling-off phase, the last residues of volatile components can be removed under vacuum in a temperature range of about 100° C. The unmeltable, but soluble copolymer necessary for the production of the polysilane-polycarbosilane solution according to the present invention can thus be produced in a single step from the dechlorinated crude polysilane/oligosilane, wherein usually other separation steps (extractions, filtrations) are no longer necessary.

If it is desired to spin fibers from the polysilane-polycarbosilane copolymer produced according to the present invention or to form other moldings, the copolymer is dissolved in inert organic solvent as known from WO 2005/108470. Above all, apolar solvents such as aliphatic hydrocarbons (e.g., n-pentane, n-hexane, cyclohexane, n-heptane, n-octane), aromatic hydrocarbons (e.g., benzene, toluene, o-xylene, sym-mesitylene), halogenated hydrocarbons (e.g., methylene chloride, chloroform, carbon tetrachloride, 1,1,1-trichloroethane, chlorobenzene) or ethers (e.g., diethyl ether, diisopropyl ether, tetrahydrofuran, 1,4-dioxane or a higher or non-symmetrical ether) are possible as solvents. The solvent is preferably a halogenated or halide-free hydrocarbon, especially preferably a halide-free aromatic hydrocarbon from the group benzene, toluene, o-xylene.

The weight percentage of the polysilane-polycarbosilane copolymer in the polymer solution can be adjusted depending on the application of the solution. If the solution is used for producing fibers according to the dry spinning process, polymer percentages of 50-90 wt. %, and preferably 60-70 wt. % are advantageous. If the solution is used for the production of ceramic matrices according to the liquid-phase infiltration process, then the polymer percentage may be selected to be markedly lower, e.g., 20 wt. %, because of the necessary low viscosity.

For using the polymer solution for the production of fibers according to the dry spinning process, it is frequently necessary, but at least usually helpful, to add a spinning aid to adjust the necessary viscoelastic properties.

Organic polymers, which are soluble in the respective solvent, for example, polyethylene, polypropylene, polystyrene, polyvinyl chloride, polyacrylonitrile or poly(4-vinylpyridine) are possible as spinning aids. The preferred spinning aid is polystyrene; the weight percentage is preferably between 1 wt. % and 5 wt. %, and especially preferably 2 wt. %.

The production of SiC ceramic fibers from the polymer solutions according to the present invention is described below, without a limitation to the application possibilities of this solution being seen therein.

The polymer fibers are produced according to the dry spinning process; this is state of the art (F. Fourné, "Synthetic Fibers," Carl Hauser Verlag 1995, p. 183; V. B. Gupta, V. K. Kothari (ed.), "Manufactured Fiber Technology," Chapman & Hall 1997, p. 126). Preferred parameters for the spinning process are the use of a pack of nozzles with nozzles having a diameter of 75 µm to 300 µm and a capillary length of 0.2 mm to 0.5 mm, a shaft temperature of 20° C. to 50° C. at a length of 2 m and a discharge rate of 100 m/min to 300 m/min.

The polymer fibers according to the present invention may be pyrolyzed without prior form-stabilizing treatment. The preferred parameters for the pyrolysis are a heating rate between 5 K/min and 50 K/min and a final temperature of 900° C. to 1,200° C. The pyrolysis may take place under an inert ($N_2$, argon) or reducing (argon/$H_2$, $N_2$/CO, etc.) atmosphere. The preferred atmosphere for the pyrolysis is nitrogen or forming gas (argon with 10 vol. % $H_2$). An electric furnace, for example, is suitable as a furnace.

After the pyrolysis, the ceramic fibers can be subjected to another heat treatment, which leads to their compression and partial crystallization and improves their mechanical strengths.

Low-oxygen ceramic fibers with a composition close to SiC, whose fiber diameter is between 5 µm and 50 µm, whose tensile strength is above 500 MPa and whose modulus of elasticity is above 120 GPa, can be produced with the process according to the present invention. Such fibers are suitable as reinforcing elements in Ceramic Matrix Composites (CMC). A solution of the polysilane-polycarbosilane copolymer in an inert solvent may also be used for the construction of ceramic matrices by liquid-phase infiltration instead of for production of fibers.

The following examples are used for the more detailed description and illustration of the present invention, without a limitation of the scope being seen in them.

EXAMPLE 1

Production of a Crude Polysilane/Oligosilane 600 g of a methylchlorodisilane mixture ("disilane fraction" from the Müller-Rochow process, consisting of 45 mol. % of $Cl_2MeSiSiMeCl_2$ and $Cl_2MeSiSiMe_2Cl$ each, as well as 10 mol. % of $ClMe_2SiSiMe_2Cl$; b.p. 150-155° C.) are mixed with 14 g of N-methylimidazole and 69 g of phenyltrichlorosilane and heated to 180° C. at a rate of 0.5 K/min. Here, approx. 450 mL of a distillate are obtained, which consists of $MeSiCl_3$, $Me_2SiCl_2$ and $Me_2ClSiSiMe_2Cl$, as well as 153 g of a dark brown crude polysilane/oligosilane, which is solid at room temperature and is susceptible to hydrolysis, with a chlorine content of approx. 25 wt.%. This is dissolved in toluene or xylene to a solution containing 60 wt. % crude polysilane/oligosilane.

EXAMPLE 2

Modification of a Crude Polysilane/Oligosilane with Diethylamine 335 mL of diethylamine dried over $CaH_2$ are charged into a 2,000-mL three-necked flask equipped with reflux cooler, KPG stirrer and dropping funnel and diluted with the same volume of absolute toluene or xylene. The solution is heated to boiling, and at the boiling heat, 380 g of a 60% solution of a crude polysilane/oligosilane obtained by disproportionation of the "disilane fraction" are added dropwise in toluene. After refluxing for two hours and cooling off, the batch is filtered off from the precipitated diethylammonium chloride by means of a pressure nutsch filter and the solvent is distilled off from the filtrate. The product still contains approx. 5 wt. % chlorine (original Cl content: 25 wt. %).

EXAMPLE 3

Modification of a Crude Polysilane/Oligosilane with Liquid Methylamine 100 mL of toluene or xylene are charged into a one-L double-walled, three-necked flask equipped with reflux cooler, dropping funnel and KPG stirrer; the double-walled flask is cooled to −30° C. by means of a cryostat. Approx. 300 mL of methylamine are condensed in and subsequently 275 g of a 60% solution of a crude polysilane/oligosilane obtained by disproportionation of the "disilane fraction" are added dropwise via the dropping funnel in toluene or xylene. The methylammonium chloride precipitated after thawing is filtered off via a pressure nutsch filter and the filtrate is freed from the solvent under vacuum at 65° C. The modified polysilane/oligosilane obtained contains less than 0.2 wt. % chlorine.

EXAMPLE 4

Modification of a Crude Polysilane/Oligosilane with Liquid Dimethylamine

The modification runs analogously to the one described in Example 2, but using dimethylamine instead of methylamine. The modified polysilane/oligosilane contains 0.2 wt. % chlorine.

EXAMPLE 5

Modification of an Oligosilane with Gaseous Dimethylamine 1,500 mL of a 60% solution of a crude polysilane/oligosilane obtained by disproportionation of the "disilane fraction" are charged into a double-walled 2-L reaction vessel equipped with bottom valve, reflux cooler, KPG stirrer, internal thermometer and gas entry tube in toluene or xylene and cooled to 0° C. Subsequently, approx. 700 g of gaseous dimethylamine are introduced under the liquid level while stirring vigorously within 3 hr. The temperature of the mixture increases here to 30-35° C. and drops again towards the end of the reaction. The product is drained off via the bottom valve while veiling over with argon and the precipitated dimethylammonium chloride is filtered off via a pressure nutsch filter.

The solvent is distilled off from the filtrate. The modified polysilane/oligosilane still contains approx. 1.5-2 wt. % chlorine.

EXAMPLE 6

Thermal Crosslinking of a Polysilane/Oligosilane Modified with Dimethylamine 600 g of the modified polysilane/oligosilane from Example 4 are heated slowly to a final temperature of approx. 400° C. in a distillation apparatus. During the heating, approx. 200 mL of a yellowish distillate are obtained, which essentially consists of $MeSi(NMe_2)_3$ and $MeSi(NMe_2)_2Cl$; the endpoint of the crosslinking is recognized from the solidification of the compound. After cooling off, the copolymer obtained, whose chlorine content is now only approx. 0.5 wt. %, is dissolved in toluene, and a spinning dope is produced with polystyrene as a spinning aid following the patent application DE 10 2004 04 531 A1.

EXAMPLE 7

Spinning of a Spinning Dope According to Example 5

The spinning dope produced according to Example 5 is spun into fibers in an extrusion apparatus with 100-μm nozzles. The filaments coming out of the nozzle plate dry in the spinning shaft in the $N_2$ counterflow and are removed at a rate of 30 m/min (deformation=3.7). Subsequently, the pyrolysis of the fiber bundle takes place at temperatures up to 1,200° C. in a nitrogen atmosphere. The ceramic fibers have diameters of 25-30 μm, tensile strengths of up to 1,160 MPa and a modulus of elasticity of up to 162 GPa. The chlorine and oxygen contents of the ceramic fibers are each less than 1 wt. %.

The invention claimed is:
1. Process for producing unmeltable polysilane-polycarbosilane copolymers which are soluble in inert solvents, comprising the steps of:
providing the product of a disproportionation of a methylchlorodisilane or a mixture of several methylchlorodisilanes of the composition $Si_2Me_nCl_{6-n}$, wherein n=1-4, wherein the disproportionation is carried out with a Lewis base as a catalyst, wherein this product is a chlorine-containing, crude polysilane/oligosilane containing hydrocarbon groups, and
thermally postcrosslinking the crude polysilane/oligosilane to a polysilane-polycarbosilane copolymer,
characterized in that the chlorine content of the polysilane-polycarbosilane copolymer is lowered by reacting crude polysilane/oligosilane with a substitution agent, by which chlorine bound therein is replaced with a chlorine-free, nitrogen-containing substituent, wherein the substitution agent is selected from amines of formula $HNR^1R^2$, wherein $R^1$ and $R^2$, independently of one another, hydrogen, alkyl, alkenyl, aryl, arylalkyl, alkylaryl, arylalkenyl, alkenylaryl, which are possibly substituted with other amino groups, or $(R^3)_3Si-[NR^3-Si(R^3)_2]_m$ with l=0 to 6, or wherein $R^1$ and $R^2$ together represent an alkylene radical with 4 or 5 carbon atoms or $-Si(R^3)_2-[NR^3-Si(R^3)_2]_n-$ with n=1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and imidazoie, and mixtures of said amines or from among compounds having an N—Si grouping.

2. Process in accordance with claim 1, characterized in that the crude polysilane/oligosilane is reacted with a substitution agent, which is selected from among ammonia, primary amines, secondary amines and mixtures thereof.

3. Process in accordance with claim 2, wherein either $R^1$ or $R^2$ or $R^1$ and $R^2$ are alkyl, and preferably methyl.

4. Process in accordance with claim 1, characterized in that the thermal postcrosslinking takes place at temperatures of 250° C. to 500° C.

5. Process in accordance with claim 1, wherein after reaction with said substitution agent, the crude polysilane/oligosilane has a chlorine content of less than 3 wt. % and the polysilane-polycarbosilane has a chlorine content of less than 1 wt. %.

6. Process for producing green fibers, comprising the steps of:
providing the product of a disproportionation of a methylchlorodisilane or a mixture of several methylchlorodisilanes of the composition $Si_2Me_nCl_{6-n}$, wherein n=1-4, wherein the disproportionation is carried out with a Lewis base as catalyst, wherein the product is a chlorine-containing, crude polysilane/oligosilane containing hydrocarbon groups,
thermally postcrosslinking the crude polysilane/oligosilane to a polysilane-polycarbosilane copolymer,
dissolving the polysilane-polycarbosilane copolymer in an inert solvent, and
spinning the dissolved polysilane-polycarbosilane copolymer to green fibers according to the dry spinning process, characterized in that the chlorine content of the polysilane-polycarbosilane copolymer is lowered by reacting the crude polysilane/oligosilane with a substitution agent, by which the chlorine bound therein is replaced with a chlorine-free, nitrogen-containing substituent, wherein the substitution agent is selected from amines of formula $HNR^1R^2$, wherein $R^1$ and $R^2$, independently of one another, hydrogen, alkyl, alkenyl, aryl, arylalkyl, alkylaryl, arylalkenyl, alkenylaryl, which are possibly substituted with other amino groups, or $(R^3)_3Si—[NR^3—Si(R^3)_2]_m$ with l=0 to 6, or wherein $R^1$ and $R^2$ together represent an alkylene radical with 4 or 5 carbon atoms or $—Si(R^3)_2—[NR^3—Si(R^3)_2]_n—$ with n=1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and imidazoie, and mixtures of said amines or from among compounds haying an N—Si grouping.

7. Process in accordance with claim 6, characterized in that a saturated hydrocarbon from the group n-pentane, n-hexane, cyclohexane, n-heptane, n-octane, an aromatic hydrocarbon from the group benzene, toluene, o-xylene, sym-mesitylene, a chlorinated hydrocarbon from the group methylene chloride, chloroform, carbon tetrachloride, 1,1,1-trichloroethane, chlorobenzene, or an ether from the group diethyl ether, diisopropyl ether, tetrahydrofuran, 1,4-dioxan or a mixture of two or more of these solvents is used as an inert solvent.

8. Process in accordance with claim 6, characterized in that the solution of the polysilane-polycarbosilane copolymer contains a spinning aid, which is preferably selected from among organic polymers, which consist of the following group: polyethylene, polypropylene, polystyrene, polyvinyl chloride, polyacrylonitrile, poly(4-vinylpyridine).

9. Process in accordance with claim 6, wherein the weight percentage of the polysilane-polycarbosilane copolymer in the solution is between 30% and 95%, and further comprising a spinning aid in a weight percentage between 0% and 10%.

10. Process for producing low-oxygen ceramic fibers with a composition close to SiC, comprising the steps:
(1) producing green fibers in accordance with claim 6, and
(2) pyrolyzing the dried green fibers from step (1) under an inert gas atmosphere or reducing atmosphere.

11. Process in accordance with claim 10, characterized in that the dry spinning process is carried out at a temperature of 20° C. to 100° C. with a discharge rate of 20 m/min to 500 m/min.

12. Process in accordance with claim 10, characterized in that the pyrolysis of the green fibers is carried out at final temperatures of 900° C. to 1,200° C. with a heating rate of 1 K/min to 50 K/min in an inert or reducing atmosphere.

13. Process in accordance with claim 10, characterized in that the ceramic fibers obtained are sintered at temperatures of 1,200-2,000° C. under an inert or reducing atmosphere.

14. Low-oxygen ceramic fibers with a composition close to SiC, whose fiber diameter is between 5 μm and 50 μm, whose tensile strength is above 500 MPa and whose modulus of elasticity is above 120 GPa, characterized in that they were produced in accordance with a process of claim 10.

15. Low-oxygen ceramic fibers in accordance with claim 14, characterized in that the Si content is between 30 at. % and 60 at. %, the C content is between 40 at. % and 70 at. %, the oxygen content is <1 wt. %, the chlorine content is less than 1 wt. %, preferably less than 0.2 wt. % and very especially preferably less than 0.1 wt. % and/or the boron content is between 0 at. % and 10 at. %.

16. Process for constructing ceramic matrices, comprising the steps of:
providing the product of a disproportionation of a methylchlorodisilane or a mixture of several methylchlorodisilanes of the composition $Si_2Me_nCl_{6-n}$, wherein n=1-4, wherein the disproportionation is carried out with a Lewis base as a catalyst, wherein this product is a chlorine-containing, crude polysilane/oligosilane containing hydrocarbon groups,
thermally postcrosslinking the crude polysilane/oligosilane to a polysilane-polycarbosilane copolymer,
dissolving the polysilane-polycarbosilane copolymer in an inert solvent, and
using the dissolved polysilane-polycarbosilane copolymer for constructing a ceramic matrix by means of liquid-phase infiltration,
characterized in that the chlorine content of the polysilane-polycarbosilane copolymer is lowered by reacting the crude polysilane/oligosilane or the polysilane-polycarbosilane copolymer with a substitution agent, by which chlorine is replaced with a chlorine-free substituent, wherein the substitution agent is selected from amines of formula $HNR^1R^2$, wherein $R^1$ and $R^2$, independently of one another, hydrogen, alkyl, alkenyl, aryl, arylalkyl, alkylaryl, arylalkenyl, alkenylaryl, which are possibly substituted with other amino groups, or $(R^3)_3Si—[NR^3—Si(R^3)_2]_m$ with l=0 to 6, or wherein $R^1$ and $R^2$ together represent an alkylene radical with 4 or 5 carbon atoms or $—Si(R^3)_2—[NR^3—Si(R^3)_2]_n—$ with n=1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and imidazoie, and mixtures of said amines or from among compounds haying an N—Si grouping.

17. Process for the production of Ceramic Matrix Composites (CMC), wherein ceramic fibers in accordance with claim 14 are incorporated as reinforcement elements.

* * * * *

UNITED STATES PATENT AND TRADEMARK OFFICE
CERTIFICATE OF CORRECTION

PATENT NO. : 8,466,076 B2
APPLICATION NO. : 13/140677
DATED : June 18, 2013
INVENTOR(S) : Ruedinger et al.

It is certified that error appears in the above-identified patent and that said Letters Patent is hereby corrected as shown below:

In the Claims

In Claim 1, Column 10, lines 50-67:

characterized in that the chlorine content of the polysilane-polycarbosilane copolymer is lowered by reacting crude polysilane/oligosilane with a substitution agent, by which chlorine bound therein is replaced with a chlorine-free, nitrogen-containing substituent, wherein the substitution agent is selected from amines of formula $HNR^1R^2$, wherein $R^1$ and $R^2$, independently of one another, hydrogen, alkyl, alkenyl, aryl, arylalkyl, alkylaryl, arylalkenyl, alkenylaryl, "which are" possibly substituted with other amino groups"," or $(R^3)_3Si-[NR^3-Si(R^3)_2]_m$ with "1=0" to 6, or wherein $R^1$ and $R^2$ together represent an alkylene radical with 4 or 5 carbon atoms or $-Si(R^3)_2-[NR^3-Si(R^3)_2]_n-$ with n = 1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and "imidazoie", and mixtures of said amines or from among compounds having an N-Si grouping.

should read:

characterized in that the chlorine content of the polysilane-polycarbosilane copolymer is lowered by reacting --the-- crude polysilane/oligosilane with a substitution agent, by which chlorine bound therein is replaced with a chlorine-free, nitrogen-containing substituent, wherein the substitution agent is selected from amines of formula $HNR^1R^2$, wherein $R^1$ and $R^2$, independently of one another, --are-- hydrogen, alkyl, alkenyl, aryl, arylalkyl, alkylaryl, arylalkenyl, alkenylaryl, possibly substituted with other amino groups or $(R^3)_3Si-[NR^3-Si(R^3)_2]_m$ with --m = 1-- to 6, or wherein $R^1$ and $R^2$ together represent an alkylene radical with 4 or 5 carbon atoms or $-Si(R^3)_2-[NR^3-Si(R^3)_2]_n-$ with n = 1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and --imidazole--, and mixtures of said amines or from among compounds having an N-Si grouping.

Signed and Sealed this
First Day of July, 2014

Michelle K. Lee
*Deputy Director of the United States Patent and Trademark Office*

In Claim 6, Column 11, lines 19-46:

wherein the disproportionation "is" carried out with a Lewis base as catalyst, wherein the product is a chlorine containing, crude polysilane/oligosilane containing hydrocarbon groups, thermally postcrosslinking the crude polysilane/oligosilane to a polysilane-polycarbosilane copolymer, dissolving the polysilane-polycarbosilane copolymer in an inert solvent, and spinning the dissolved polysilane-polycarbosilane copolymer to green fibers according to the dry spinning process, characterized in that the chlorine content of the polysilane-polycarbosilane copolymer is lowered by reacting the crude polysilane/oligosilane with a substitution agent, by which the chlorine bound therein is replaced with a chlorine-free, nitrogen-containing substituent, wherein the substitution agent is selected from amines of formula $HNR^1R^2$, wherein $R^1$ and $R^2$, independently of one another, hydrogen, alkyl, alkenyl, aryl, arylalkyl, alkylaryl, arylalkenyl, alkenylaryl, "which are" possibly substituted with other amino groups"," or $(R^3)_3Si-[NR^3-Si(R^3)_2]_m$ with "1=0" to 6, or wherein $R^1$ and $R^2$ together represent an alkylene radical with 4 or 5 carbon atoms or $-Si(R^3)_2-[NR^3-Si(R^3)_2]_n-$ with n = 1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and "imidazoie", and mixtures of said amines or from among compounds "haying" an N-Si grouping.

should read:

wherein the disproportionation --was-- carried out with a Lewis base as catalyst, wherein the product is a chlorine-containing, crude polysilane/oligosilane containing hydrocarbon groups, thermally postcrosslinking the crude polysilane/oligosilane to a polysilane-polycarbosilane copolymer, dissolving the polysilane-polycarbosilane copolymer in an inert solvent, and spinning the dissolved polysilane-polycarbosilane copolymer to green fibers according to the dry spinning process, characterized in that the chlorine content of the polysilane-polycarbosilane copolymer is lowered by reacting the crude polysilane/oligosilane with a substitution agent, by which the chlorine bound therein is replaced with a chlorine-free, nitrogen-containing substituent, wherein the substitution agent is selected from amines of formula $HNR^1R^2$, wherein $R^1$ and $R^2$, independently of one another, --are-- hydrogen, alkyl, alkenyl, aryl, arylalkyl, alkylaryl, arylalkenyl, alkenylaryl possibly substituted with other amino groups or $(R^3)_3Si-[NR^3-Si(R^3)_2]_m$ with --m = 1-- to 6, or wherein $R^1$ and $R^2$ together represent an alkylene radical with 4 or 5 carbon atoms or $-Si(R^3)_2-[NR^3-Si(R^3)_2]_n-$ with n = 1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and --imidazole--, and mixtures of said amines or from among compounds --having-- an N-Si grouping.

In Claim 16, Column 12, lines 32-60:

wherein the disproportionation "is" carried out with a Lewis base as a catalyst, wherein this product is a chlorine-containing, crude polysilane/oligosilane containing hydrocarbon groups, thermally postcrosslinking the crude polysilane/oligosilane to a polysilane-polycarbosilane copolymer, dissolving the polysilane-polycarbosilane copolymer in an inert solvent, and using the dissolved polysilane-polycarbosilane copolymer for constructing a ceramic matrix by means of liquid-phase infiltration, characterized in that the chlorine content of the polysilane-polycarbosilane copolymer is lowered by reacting the crude polysilane/oligosilane or the polysilane-polycarbosilane copolymer with a substitution agent, by which chlorine is replaced with a chlorine-free substituent, wherein the substitution agent is selected from amines of formula $HNR^1R^2$, wherein $R^1$ and $R^2$, independently of one another, hydrogen, alkyl, alkenyl, aryl, arylalkyl, alkylaryl, arylalkenyl, alkenylaryl, "which are" possibly substituted with other amino groups"," or $(R^3)_3Si-[NR^3-Si(R^3)_2]_m$ with "1= 0" to 6, or wherein $R^1$ and $R^2$ together represent an alkylene radical with 4 or 5 carbon atoms or $-Si(R^3)_2-[NR^3-Si(R^3)_2]_n-$ with n = 1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and "imidazoie", and mixtures of said amines or from among compounds "haying" an N-Si grouping.

should read:

wherein the disproportionation --was-- carried out with a Lewis base as a catalyst, wherein this product is a chlorine-containing, crude polysilane/oligosilane containing hydrocarbon groups, thermally postcrosslinking the crude polysilane/oligosilane to a polysilane-polycarbosilane copolymer, dissolving the polysilane-polycarbosilane copolymer in an inert solvent, and using the dissolved polysilane-polycarbosilane copolymer for constructing a ceramic matrix by means of liquid-phase infiltration, characterized in that the chlorine content of the polysilane-polycarbosilane copolymer is lowered by reacting the crude polysilane/oligosilane or the polysilane-polycarbosilane copolymer with a substitution agent, by which chlorine is replaced with a chlorine-free substituent, wherein the substitution agent is selected from amines of formula $HNR^1R^2$, wherein $R^1$ and $R^2$, independently of one another, --are-- hydrogen, alkyl, alkenyl, aryl, arylalkyl, alkylaryl, arylalkenyl, alkenylaryl, possibly substituted with other amino groups or $(R^3)_3Si-[NR^3-Si(R^3)_2]_m$ with --m = 1-- to 6, or wherein $R^1$ and $R^2$ together represent an alkylene radical with 4 or 5 carbon atoms or $-Si(R^3)_2-[NR^3-Si(R^3)_2]_n-$ with n = 1 to 6, wherein in all cases each radical $R^3$, independently of other $R^3$ radicals, may be hydrogen, alkyl or aryl, as well as cyclic amines, selected from among pyrrole, indole, carbazole, pyrazole, piperidine and --imidazole--, and mixtures of said amines or from among compounds --having-- an N-Si grouping.